(12) United States Patent
Liu et al.

(10) Patent No.: US 7,728,255 B2
(45) Date of Patent: Jun. 1, 2010

(54) SPINNING-TYPE PATTERN-FABRICATION SYSTEM AND A METHOD THEREOF

(75) Inventors: Ming-Dah Liu, Hsinchu (TW); Jui-Nien Jao, Hsinchu (TW); Wen-Hsin Lo, Hsinchu (TW)

(73) Assignee: Coretronic Corporation, Hsinchu (TW)

( * ) Notice: Subject to any disclaimer, the term of this patent is extended or adjusted under 35 U.S.C. 154(b) by 542 days.

(21) Appl. No.: 11/696,240

(22) Filed: Apr. 4, 2007

(65) Prior Publication Data

US 2007/0251930 A1 Nov. 1, 2007

(30) Foreign Application Priority Data

Apr. 28, 2006 (TW) ............................... 95115342 A

(51) Int. Cl.
B23K 26/38 (2006.01)
B23K 26/08 (2006.01)

(52) U.S. Cl. ............................ 219/121.68; 219/121.69; 219/121.76; 219/121.82

(58) Field of Classification Search ............ 219/121.68, 219/121.69, 121.78, 121.79, 121.82, 121.76, 219/121.84; 74/813 R; 901/9
See application file for complete search history.

(56) References Cited

U.S. PATENT DOCUMENTS

| | | | | |
|---|---|---|---|---|
| 4,358,467 A | * | 11/1982 | Patel | ..................... 219/121.84 |
| 4,542,278 A | * | 9/1985 | Taylor | ................... 219/121.79 |
| 4,808,064 A | * | 2/1989 | Bartholet | ........................ 901/9 |
| 4,892,992 A | * | 1/1990 | Akeel et al. | ............ 219/121.84 |
| 4,952,789 A | * | 8/1990 | Suttie | ................... 219/121.82 |
| 5,576,536 A | | 11/1996 | Hiramatsu et al. | |
| 5,784,932 A | * | 7/1998 | Gilberti | ................... 74/813 R |
| 5,847,820 A | | 12/1998 | Hamar | |
| 6,172,330 B1 | * | 1/2001 | Yamamoto et al. | ..... 219/121.82 |
| 6,842,025 B2 | * | 1/2005 | Gershenzon et al. | .......... 356/73 |
| 6,843,587 B2 | | 1/2005 | Park et al. | |
| 2003/0210539 A1 | | 11/2003 | Park et al. | |

FOREIGN PATENT DOCUMENTS

| | | | | |
|---|---|---|---|---|
| JP | 60-37286 A | * | 2/1985 | |
| JP | 63-168277 | | 7/1988 | |
| JP | 01-273683 A | * | 11/1989 | |
| JP | 10-82905 | | 3/1998 | |
| JP | 11-142786 A | * | 5/1999 | |
| JP | 2001317994 | | 11/2001 | |
| JP | 2005310410 | | 11/2005 | |
| TW | 282515 | | 8/1996 | |
| TW | 321737 | | 12/1997 | |
| WO | WO-90/00459 A1 | * | 1/1990 | |

* cited by examiner

*Primary Examiner*—Geoffrey S Evans
(74) *Attorney, Agent, or Firm*—Ming Chow; Sinorica, LLC

(57) ABSTRACT

A spinning-type pattern-fabrication system comprises at least one carry table used to carry objects, an object-fixing device used to fix the objects onto the carry table, and a control system controlling carry table or at least one laser device. The control system controls the laser device to move linearly back and forth to enable the laser device to fabricate patterns on the objects with the laser beam emitted via the laser device.

17 Claims, 13 Drawing Sheets

SPINNING-TYPE PATTERN-FABRICATION SYSTEM AND A METHOD THEREOF

BACKGROUND OF THE INVENTION

1. Field of the Invention

The present invention relates to a pattern-fabrication technology, particularly to a spinning-type pattern-fabrication system and a method thereof.

2. Description of the Related Art

Non-self-luminous liquid crystal material has been extensively used in LCD (Liquid Crystal Display) devices for computer monitors and television screens. A backlight module is used to generate light source and illuminate liquid crystal material so that the LCD devices can present images. In a backlight module, an element dominating light efficiency, LGP (Light Guide Plate), guides the direction of light and influences the brightness of the panel. The light-guide function of a LGP is implemented via the pattern on the LGP. In the conventional technology, the LGP pattern is fabricated with a laser beam emit via a laser device.

The conventional laser device for fabricating patterns on LGP utilizes X-Y direction slide ways to move a laser source or a reflective mirror so that the laser beam is directed to a to-be-fabricated position. Otherwise, the conventional laser device for fabricating patterns on LGP may utilize X-Y direction slide ways to move a to-be-fabricated position of LGP to below a laser beam. Refer to FIG. 1 and FIG. 2 for a U.S. Pat. No. 6,843,587. In the U.S. patent, a vacuum device 2 fixes an LGP 4 onto a table 6; after the pattern data has be input into the equipment, a laser beam-moving device 8 controls the laser beam emit via a laser device 10 to perform the fabrication of patterns 14 on the LGP surface 12. According to the input data, the laser beam-moving device 8 utilizes a control system 16 to respectively control a horizontal moving device 18 to move along a horizontal rail 20 and a vertical moving device 22 to move along a vertical rail 24. A first reflective mirror 26 and a second reflective mirror 28, which are installed on the horizontal rail 20, are used to direct the laser beam emit via the laser device 10 to a lens device 30. Then, the laser beam is focused on the LGP surface 12 to perform a fabrication process of the patterns 14 on the LGP 4. Briefly to speak, the conventional technology moves the reflective mirrors to direct the laser beam to the exact fabrication position. Thus, patterns of various lengths, depths and spacings are formed on the LGP 4.

However, the conventional device for fabricating LGP patterns has to change its position on the X-Y plane one time for each one pattern, which causes a long fabrication time. If the patterns are fabricated via that the laser beam scans a given region, the pattern fabrication can be speeded up. However, in such a method, the scanned regions have to be very close to each other. Thus, it needs very accurate offset to guarantee that the LGP surfaces are in the correct positions. Further, when the laser beam scans a region, the powers applied to different patterns will be different because of the eccentricity of the reflective mirror. Thus, the manufacturer has to purchase better (more expensive) laser systems to avoid the occurrence of errors. Consequently, the fabrication cost is indirectly raised. However, no matter which one of abovementioned methods is used to fabricate LGP patterns, the main drawback is that one fabrication operation only fabricates one single LGP. Therefore, they are all disadvantaged in lacking mass-productivity.

Accordingly, the present invention proposes a spinning-type pattern-fabrication system and a method thereof to solve the abovementioned problems.

SUMMARY OF THE INVENTION

One of the objectives of the present invention is to provide a spinning-type pattern-fabrication system and a method thereof, which is advantaged in the capability of mass production. Via rotating the carry table or the laser device, and moving the laser device linearly back and forth, the laser device emits a laser beam to fabricate multiple patterns on multiple objects in a single pattern-fabrication operation.

Another objective of the present invention is to provide a spinning-type pattern-fabrication system and a method thereof, which is advantaged in a high speed of pattern fabrication.

According to the present invention, multiple objects are uniformly arranged along the perimeter of at least one rotary table, and the objects are fixed onto the rotary table via an object-fixing device; a control system controls the rotary table to rotate and controls at least one laser device to move linearly back and forth so that the laser device sequentially fabricates patterns on the objects with the laser beam emit via the laser device. Otherwise, the table may be non-rotary but just used as a carry table for carrying multiple objects, and the control system controls the laser device to rotate and to move linearly back and forth so that the laser device sequentially fabricates patterns on the objects with the laser beam emit via the laser device. Further, at least two rotary tables/carry tables and at least two laser devices may be stacked one by one to simultaneously fabricate patterns on the objects disposed on different rotary tables/carry tables.

To enable the objectives, technical contents, characteristics and accomplishments of the present invention to be more easily understood, the embodiments of the present invention are to described in detail in cooperation with the attached drawings below.

DETAILED DESCRIPTION OF THE INVENTION

The present invention is a system and a method, which integrates a rotation movement and a linear movement to enable the laser beam emit via a laser device to rapidly and accurately fabricate patterns on multiple objects. The present invention applies to any object, whose patterns may be fabricated with a laser device. Below, the object, whose patterns are fabricated with a laser device, will be exemplified via an LGP.

Figure 1:
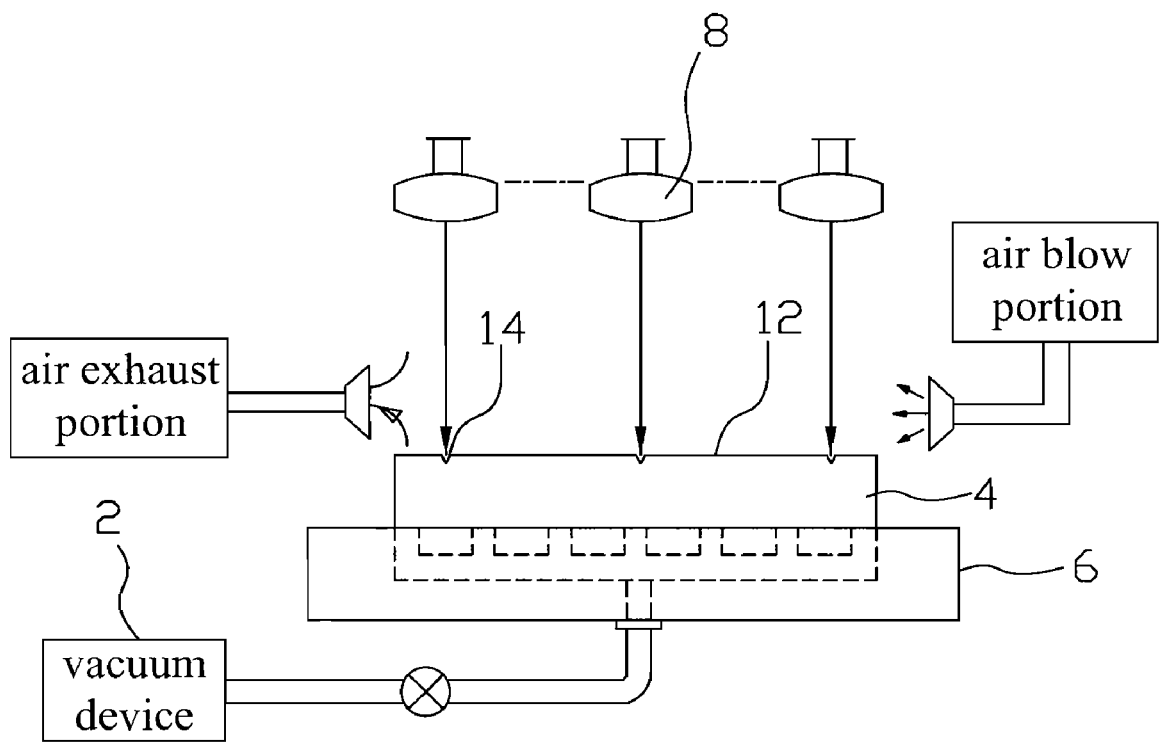
FIG. 1 is a diagram schematically showing the system architecture of a conventional LGP pattern-fabrication system.
Figure 2:
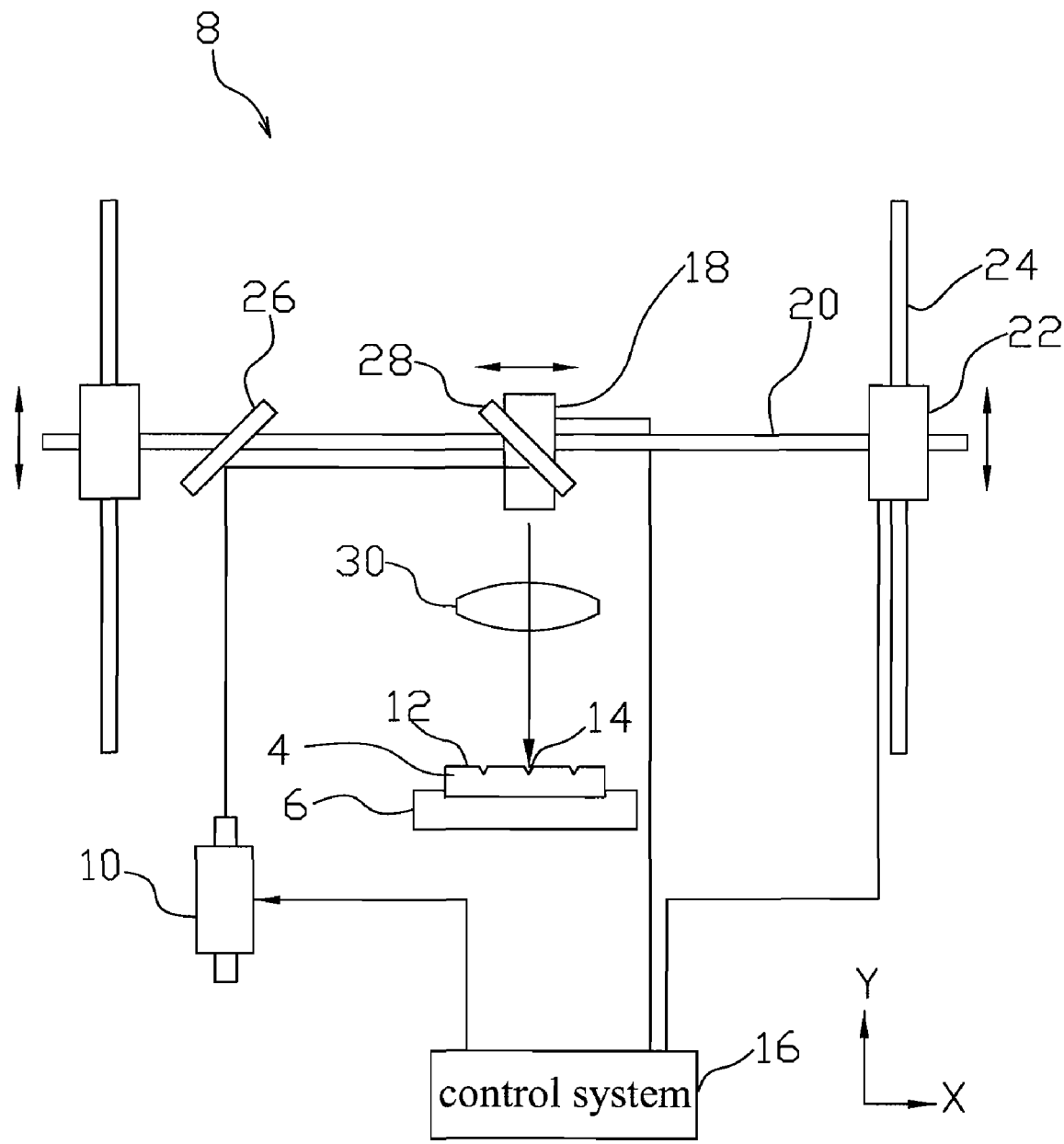
FIG. 2 is a partial view schematically showing a conventional laser beam-movement device.
Figure 3:
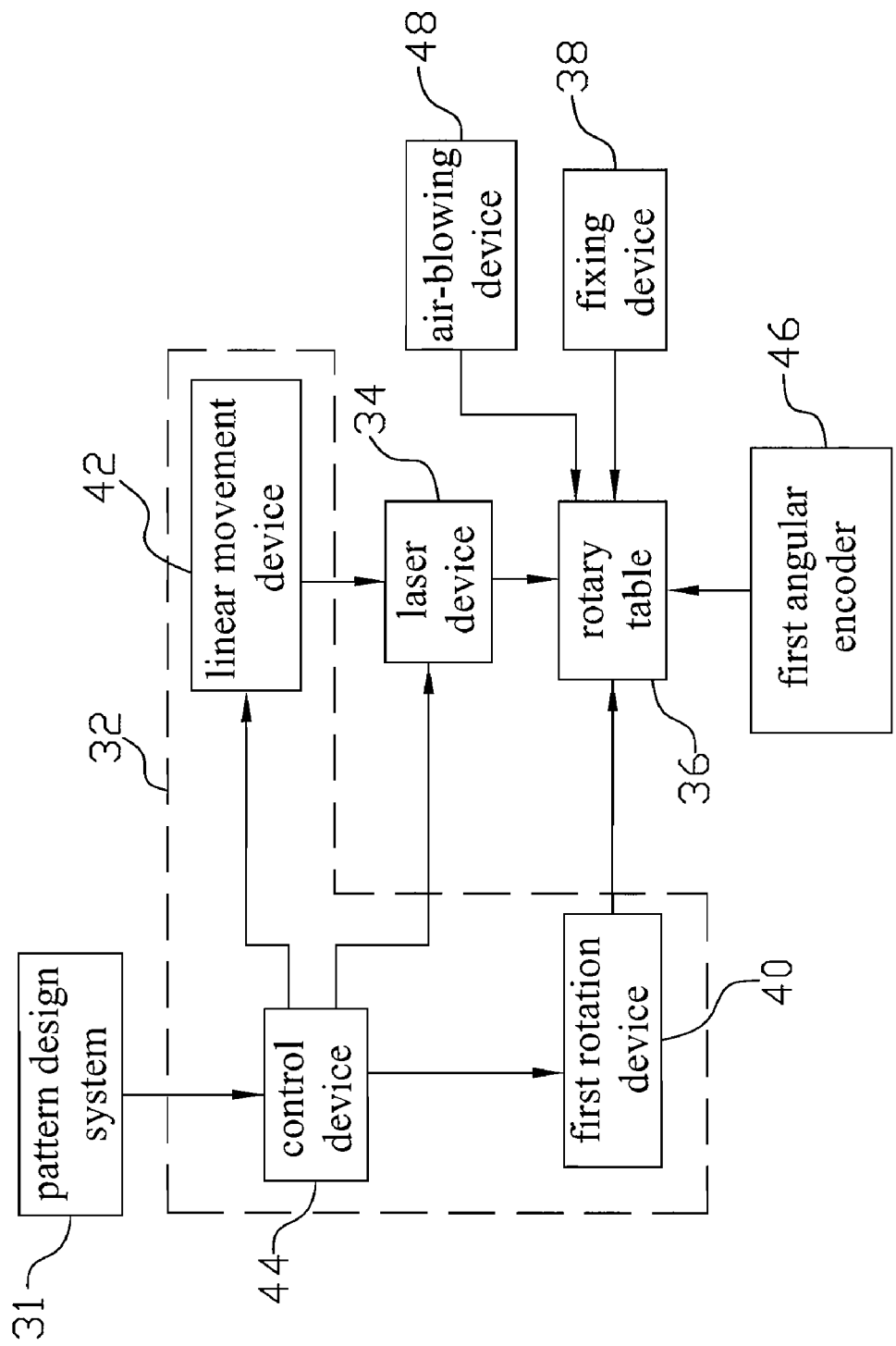
FIG. 3 is a diagram schematically showing the system architecture according to one embodiment of the present invention.

Refer to FIG. 3 a diagram schematically showing the system architecture according to one embodiment of the present invention. In this embodiment, the system architecture comprises a pattern design system 31; a control system 32, connected with the pattern design system 31, and controlling the process of fabricating LGP patterns; a laser device 34, connected with the control system 32, and emitting a laser beam to fabricate LGP patterns; a rotary table 36, accommodating LGP's, and preferred to be circular; a fixing device 38 (such as a vacuum device), installed on the rotary table 36, and used to fix LGP's. The control system 32 further comprises a first rotation device 40 (such as a motor), installed to the rotary table 36, and used to control the rotation of the rotary table 36; a linear movement device 42, installed to the laser device 34, and used to drive the laser device 34 to move linearly back and forth; and a control device 44, respectively connected with the first rotation device 40, the linear movement device 42 and the pattern design system 31, and controlling the first rotation device 40 and the linear movement device 42 according to the parameters of the pattern design system 31. The system architecture also comprises a first angular encoder 46, used to detect the angular position of the rotary table 36; and a air-blowing device 48, used to blow away the smoke generated in the fabrication of LGP patterns.

Figure 4:
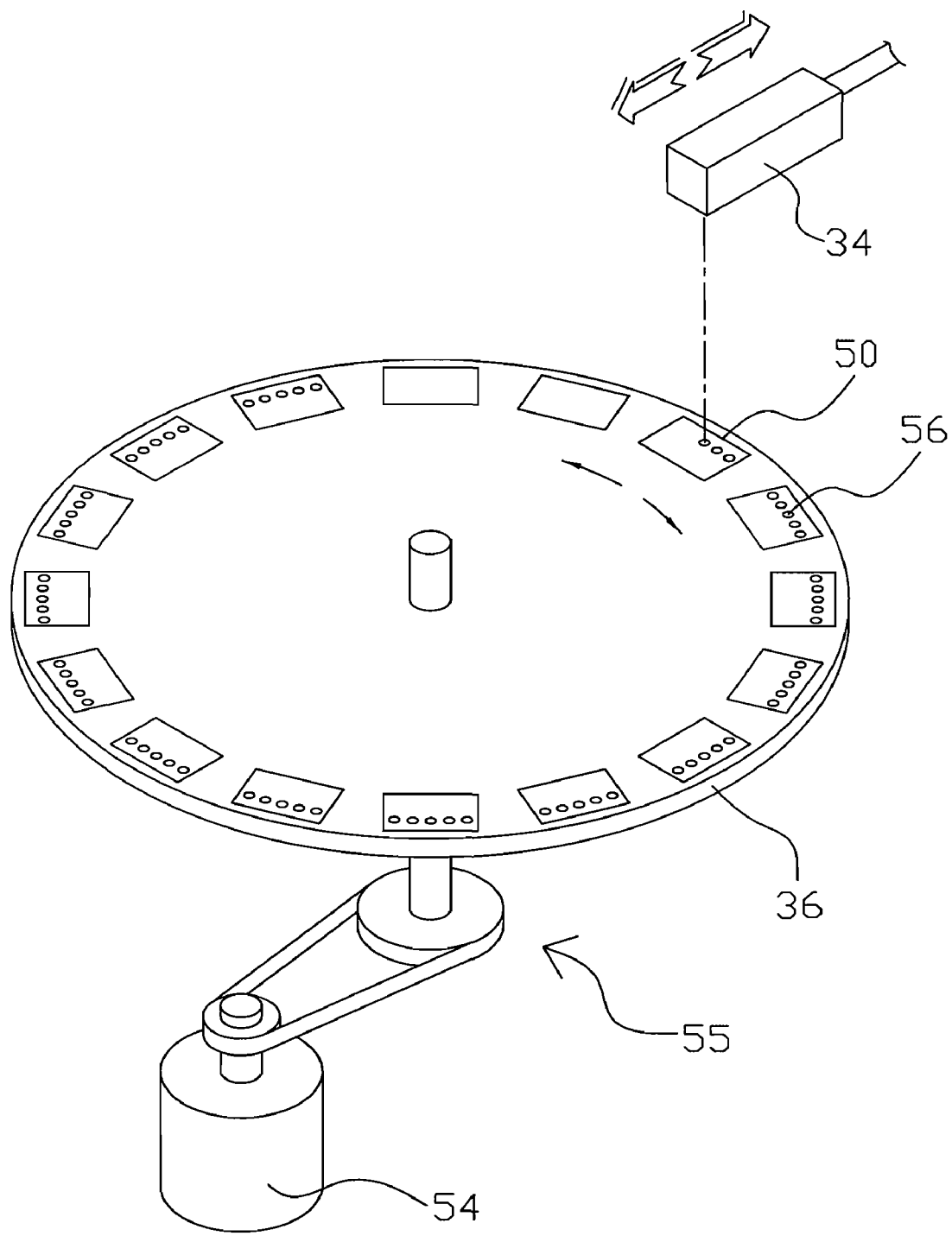
FIG. 4 is a perspective view schematically showing one embodiment of the present invention.
Figure 5:
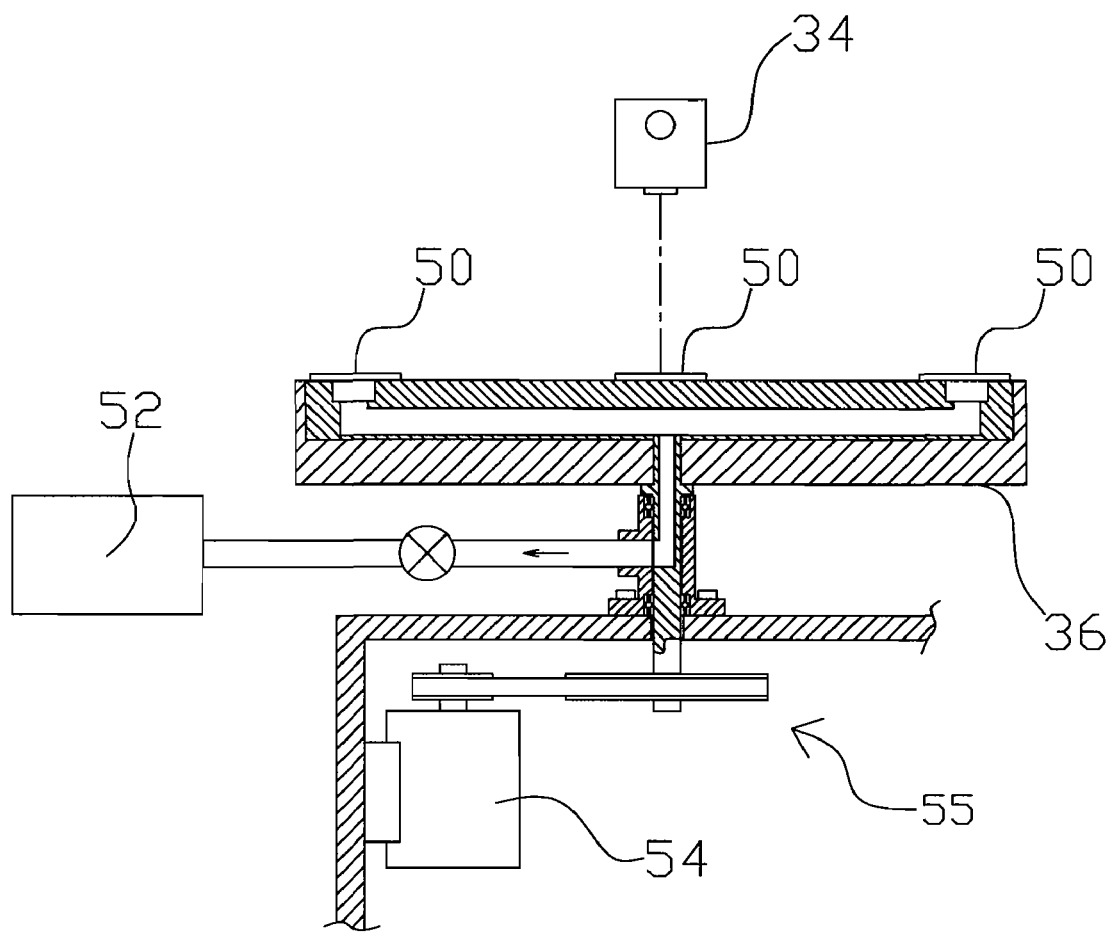
FIG. 5 is a sectional view schematically showing one embodiment of the present invention.
Figure 6:
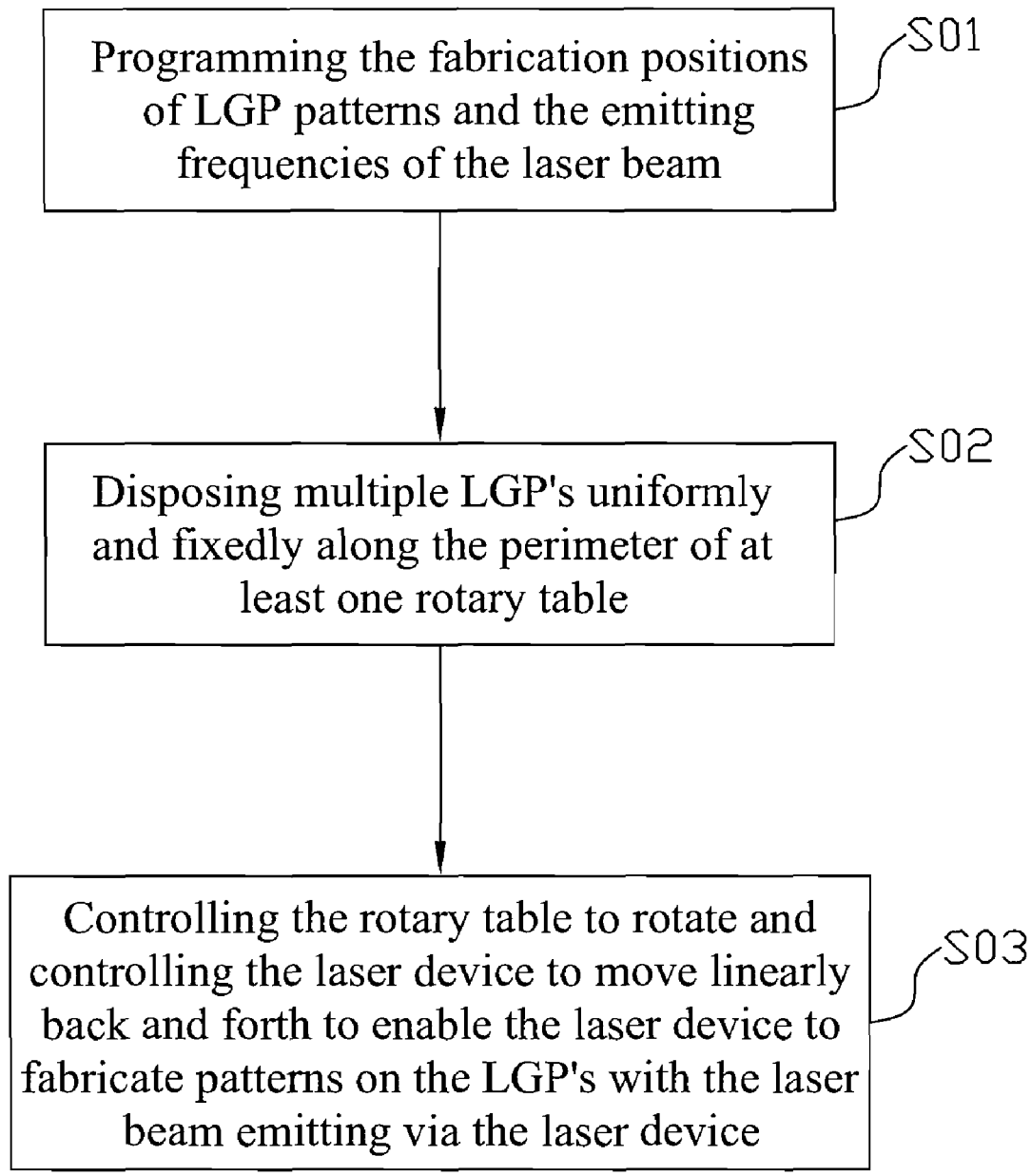
FIG. 6 is a flowchart of the pattern fabrication process according to one embodiment of the present invention.

Refer to FIG. 4 and FIG. 5 a perspective view and a sectional view schematically showing one embodiment of the present invention, the rotary table 36 is a circular one, and the fixing device is a vacuum device, and the first rotation device is a motor. Also refer to FIG. 6 a flowchart of the pattern-fabrication process according to one embodiment of the present invention. In Step S01, the control system programs the fabrication positions of LGP patterns and the emitting frequency of the laser beam according to the parameters provided via the pattern design system 31. Next, the process proceeds to Step S02, multiple LGP's 50 are uniformly arranged on the rotary table 36, and a vacuum device 52 is used to suck LGP's 50 fixedly onto the rotary table 32. Next, the process proceeds to Step S03, the control device of the control system controls a motor 54 to drive the rotary table 36 to rotate via a transmission device 55 at the speed corresponding to the programmed emitting frequency of the laser beam, and the control device also controls the linear movement device 42 to move the laser device 34 back and forth according to the programmed fabrication positions of LGP patterns, so that the laser device 34 emits the laser beam according to the emitting frequency of the laser beam to fabricate the LGP patterns 56 on LGP's 50.

Figure 7:
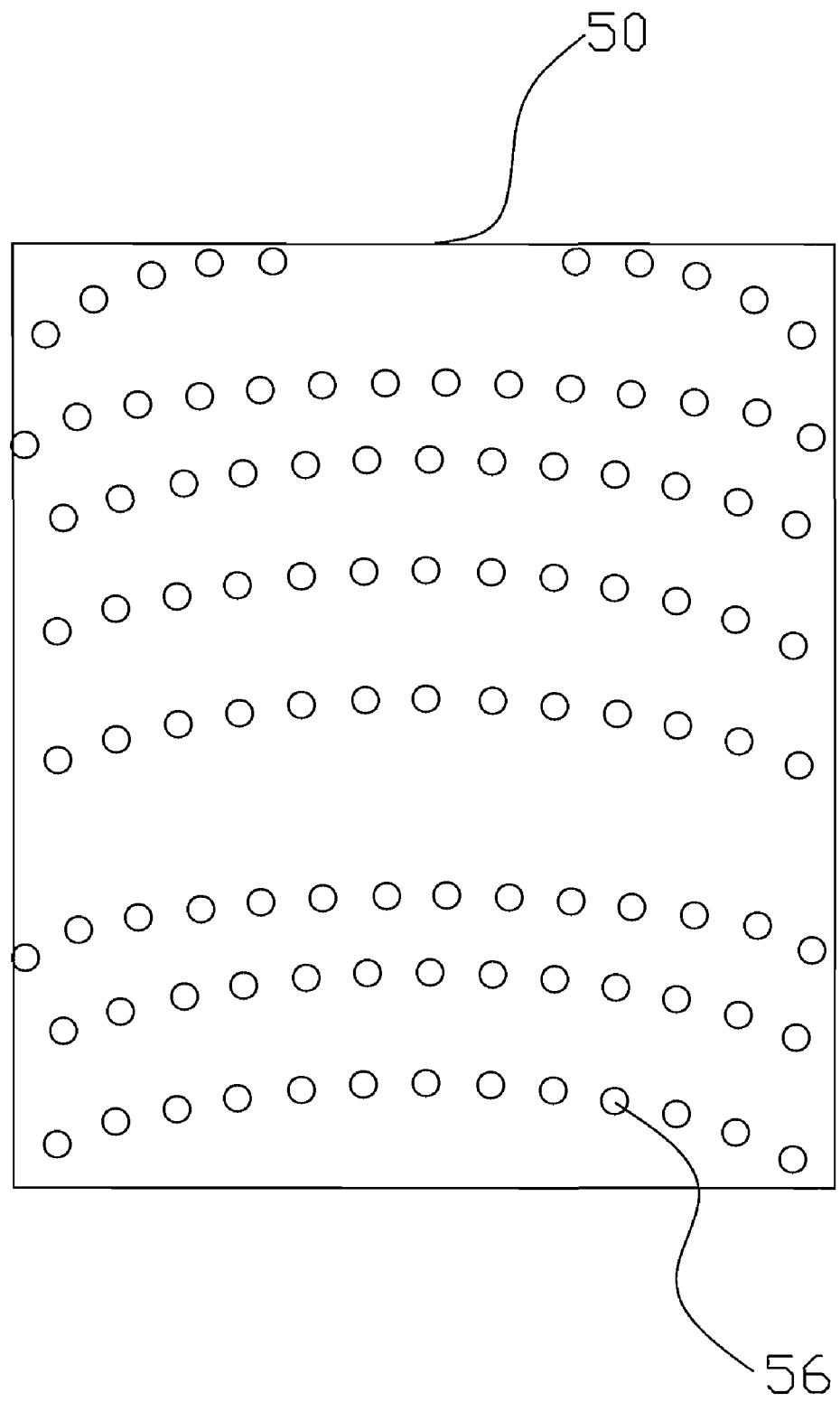
FIG. 7 is a diagram schematically the LGP with finished patterns.

Thereby, via the rotation of the rotary table 36 and the linear movement of the laser device 34, the LGP patterns 56 of each LGP 50 on the rotary table 36 is sequentially fabricated outward from the inner side or inward from the outer side. For example, when the LGP patterns 56 of each LGP 50 is sequentially fabricated inward from the outer side, the control system controls the rotary table 36 to rotate to a preset position according to the angular position detected via the first angular encoder 46, and the control system also controls the linear movement device 42 to move the laser device 34 to the preset fabrication positions of LGP patterns; then, when the rotary table 36 is rotating, the laser device 34 emits the laser beam to sequentially fabricate the outermost circle of LGP pattern on each LGP 50 from the preset position according to the angular position detected via the first angular encoder 46 and the programmed emitting frequency of the laser beam until the LGP pattern 56 in the outermost circle of the last LGP 50 has been fabricated. After the outermost circle of LGP patterns 56 have been completed, the linear movement device 42 moves the laser device 34 forward, i.e. toward the center of the rotary table 36, and the laser device 34 proceeds to fabricate the second circle of LGP patterns 56. The abovementioned procedures are undertaken repeatedly until all the LGP patterns 56 (as shown in FIG. 7) of all LGP's 50 have been completed. Smoke is generated in the fabrication process of LGP patterns, and smoke may shelter laser light and influence the quality of LGP patterns. To solve the abovementioned problem, the present invention further comprises an air-blowing device 48, which blows air to the position where an LGP pattern is being fabricated; thus, smoke is blown away, and the quality of LGP patterns are maintained.

Figure 8:
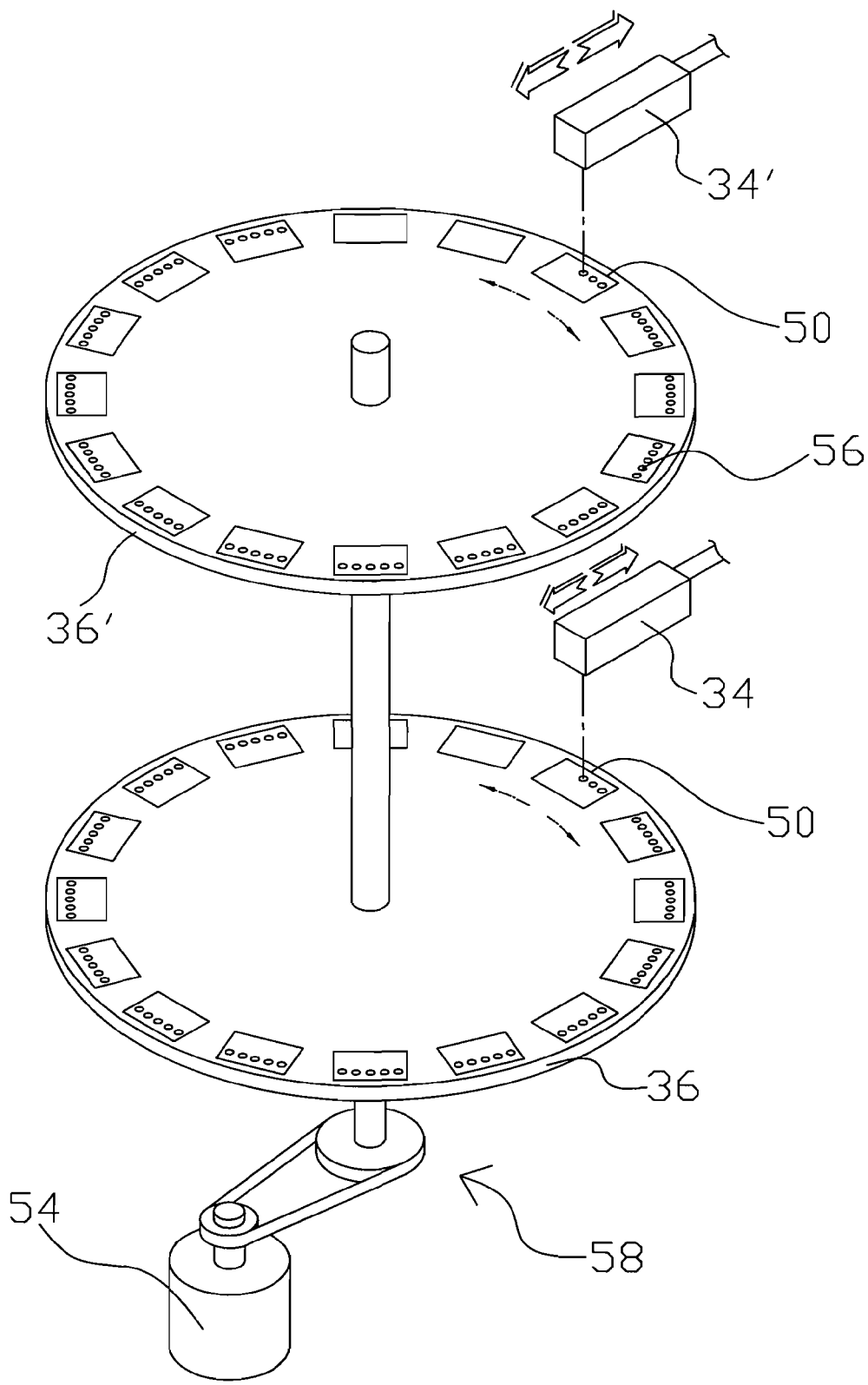
FIG. 8 is a perspective view schematically showing another embodiment of the present invention, which comprises the structure of the tables and the laser devices stacked one by one.

According to another embodiment of the present invention, at least two rotary tables and at least two laser devices are stacked one by one to respectively fabricate LGP patterns on different LGP's disposed on different rotary tables at the same time so that the scale of mass production is promoted. For example, as shown in FIG. 8, two rotary tables 36 and 36' are stacked one by one and coupled via a transmission device 58, and the transmission device 58 is further coupled to a motor 54. A control device 44 controls the motor 54 to drive the rotary tables 36 and 36' to rotate at the speed corresponding to the emitting frequency of the laser beam. The control device 44 also controls the linear movement device 42 to move the laser device 34 and 34' to the programmed fabrication positions back and forth. Thereby, multiple LGP patterns 56 may be respectively fabricated on multiple LGP's 50 simultaneously in a single fabrication operation.

Figure 9:
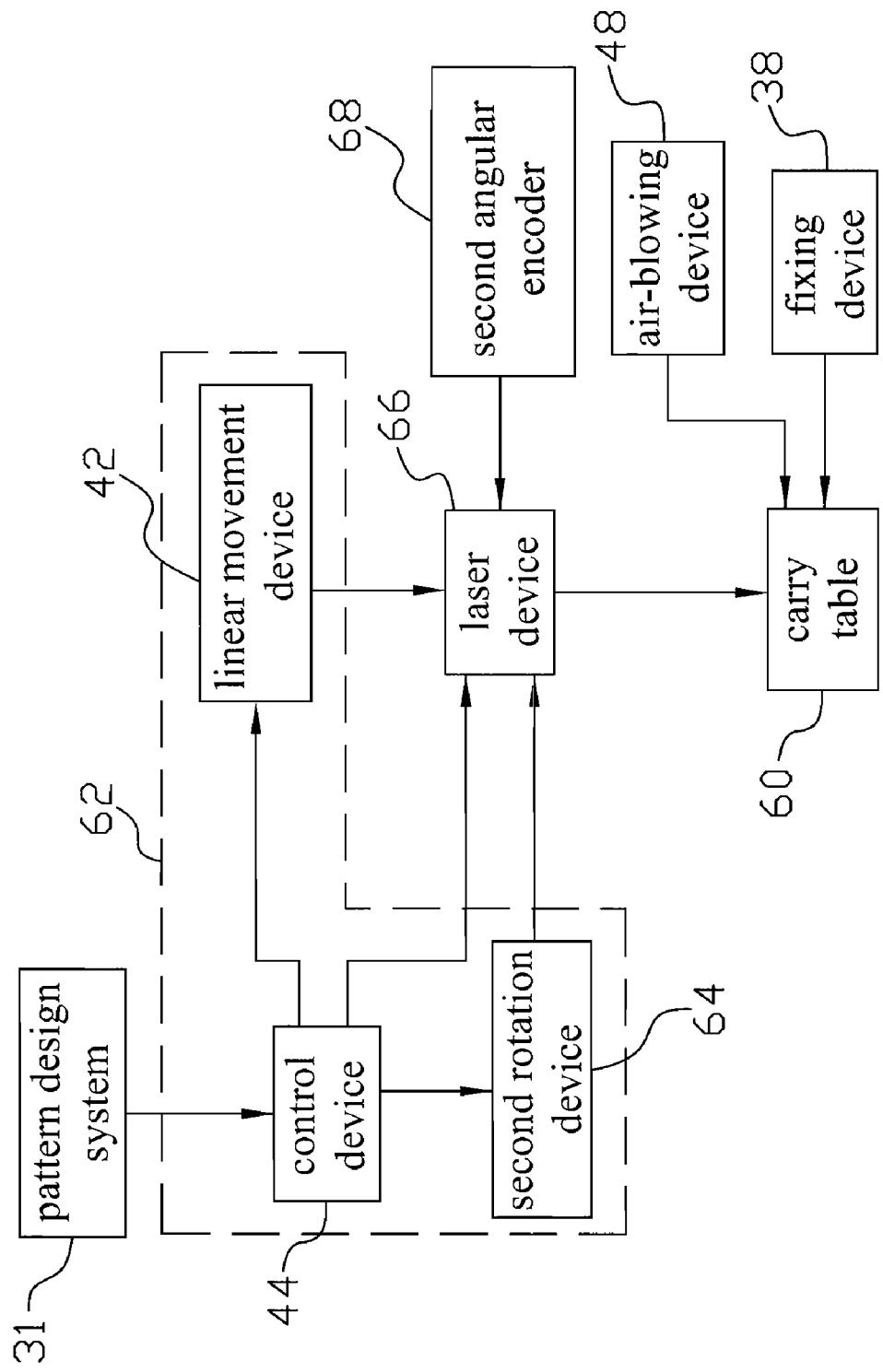
FIG. 9 is the system architecture according to yet another embodiment of the present invention.

Refer to FIG. 9 the system architecture according to yet another embodiment of the present invention. As shown in FIG. 9, the architecture is essentially similarly to that of the abovementioned embodiments. However, the carry table 60 is non-rotary but only used to accommodate multiple LGP's. A second rotation device 64 of a control system 62 is used to control a laser device 66 to rotate, and a second angular encoder 68 is coupled to the laser device 66 and used to detect the angular position of the laser device 66.

Figure 10:
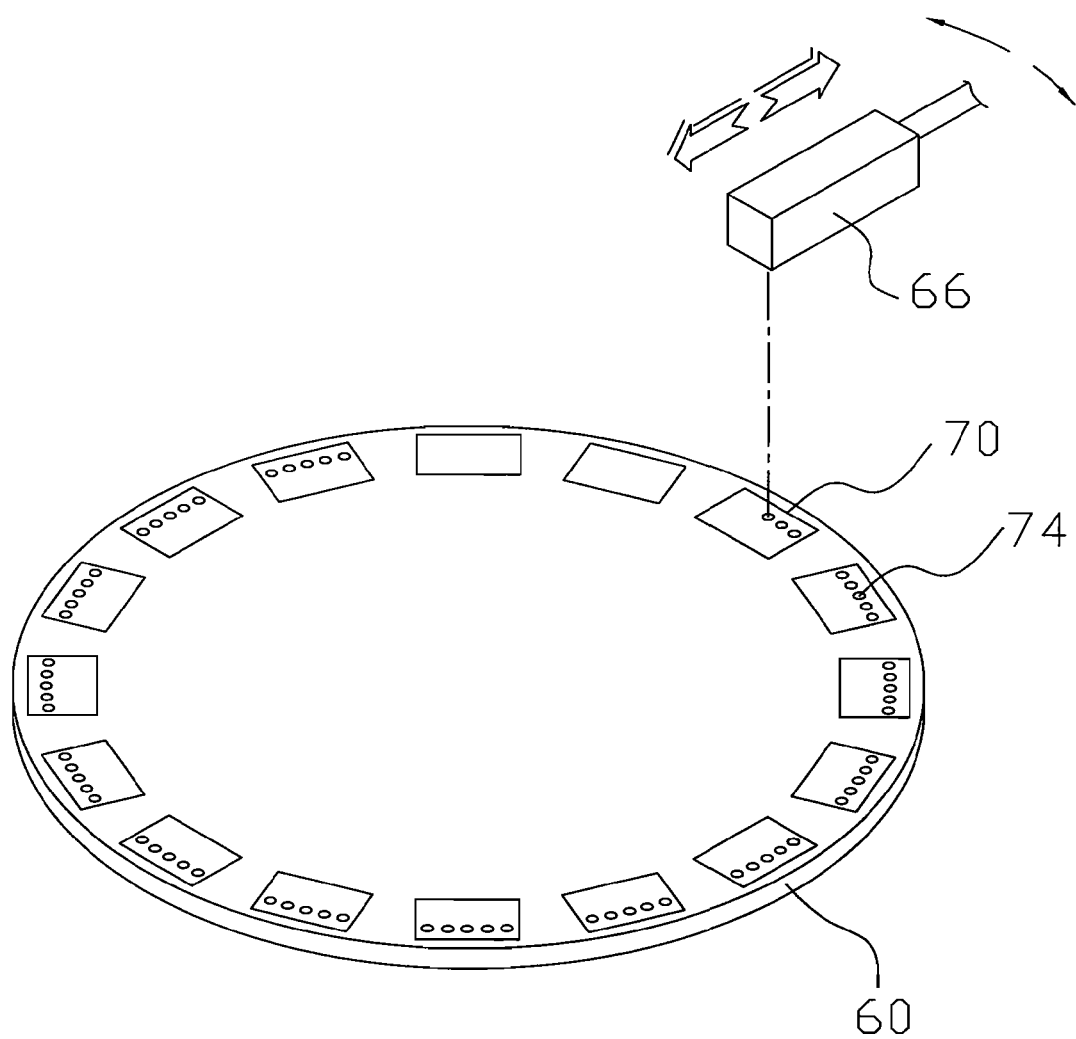
FIG. 10 is a perspective view schematically showing still another embodiment of the present invention.
Figure 11:
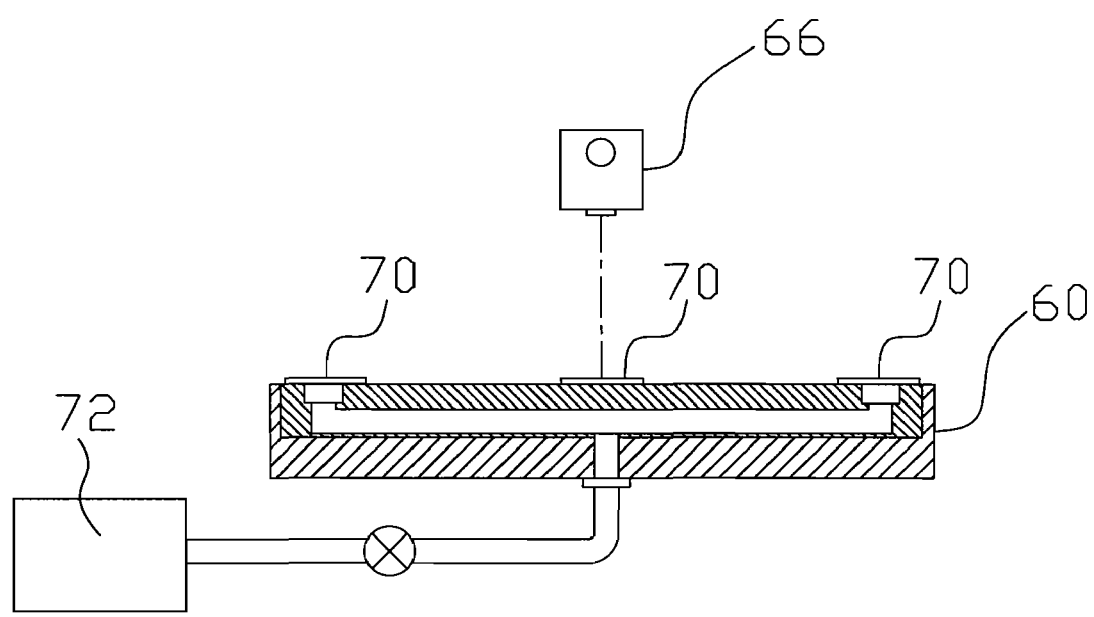
FIG. 11 is a sectional view schematically still another embodiment of the present invention.
Figure 12:
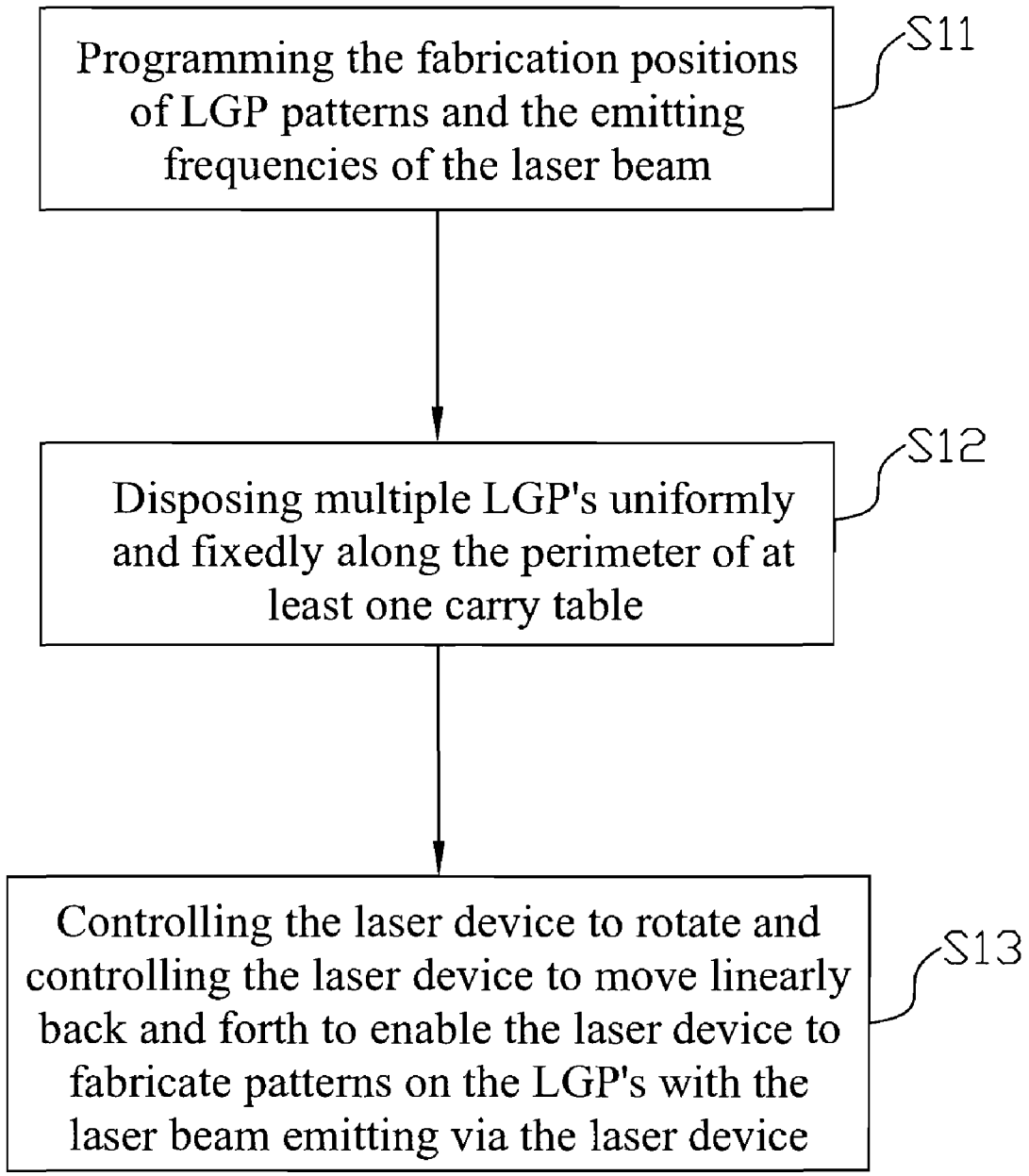
FIG. 12 is a flowchart of the fabrication process according to still another embodiment of the present invention.

Refer to FIG. 10 and FIG. 11 for still another embodiment of the present invention. FIG. 10 and FIG. 11 are respectively a perspective view and a sectional view schematically showing that a circular table is used as the carry table, and a vacuum device is used as the fixing device. Also refer to FIG. 12 for the flowchart of the fabrication process according to this embodiment. In Step S11, a control system programs the fabrication positions of LGP patterns and the emitting frequency of the laser beam according to the parameters provided via a pattern design system 31. Next, the process proceeds to Step S12, multiple LGP's 70 are uniformly arranged along the perimeter of the carry table 60, and a vacuum device 72 is used to suck LGP's 70 fixedly onto the carry table 60. Next, the process proceeds to Step S13, the control system controls a second rotation device 64 to drive the laser device 66 to rotate at the speed corresponding to the programmed emitting frequency of the laser beam, and the control system also controls a linear movement device 42 to linearly move the laser device 66 back and forth according to the programmed fabrication positions of LGP patterns 74, and thus, the laser device 66 emits a laser beam according to the programmed emitting frequency to sequentially fabricate LGP patterns 74 of each LGP 70 inward from the outer side or outward from the inner side. For example, when the LGP patterns 74 of each LGP 70 is sequentially fabricated outward from the inner side, the control system controls the second rotation device 64 to drive the laser device 66 to rotate to a preset position according to the angular position detected via a second angular encoder 68, and the control system also controls the linear movement device 42 to move the laser device 66 to the preset fabrication position; then, when the laser device 66 is rotating, the laser device 34 emits the laser beam to sequentially fabricate the innermost circle of LGP pattern on each LGP 70 from the preset position according to the angular position detected via the second angular encoder 68 and the programmed emitting frequency of the laser beam until the LGP pattern 74 in the innermost circle of the last LGP 70 has been fabricated. After the innermost circle of LGP patterns 74 have been completed, the linear movement device 42 moves the laser device 66 outward, i.e. toward the perimeter of the carry table 60, and the laser device 66 proceeds to fabricate the second circle of LGP patterns 74. The abovementioned procedures are undertaken repeatedly until all the LGP patterns 74 of all LGP's 70 have been completed.

Figure 13:
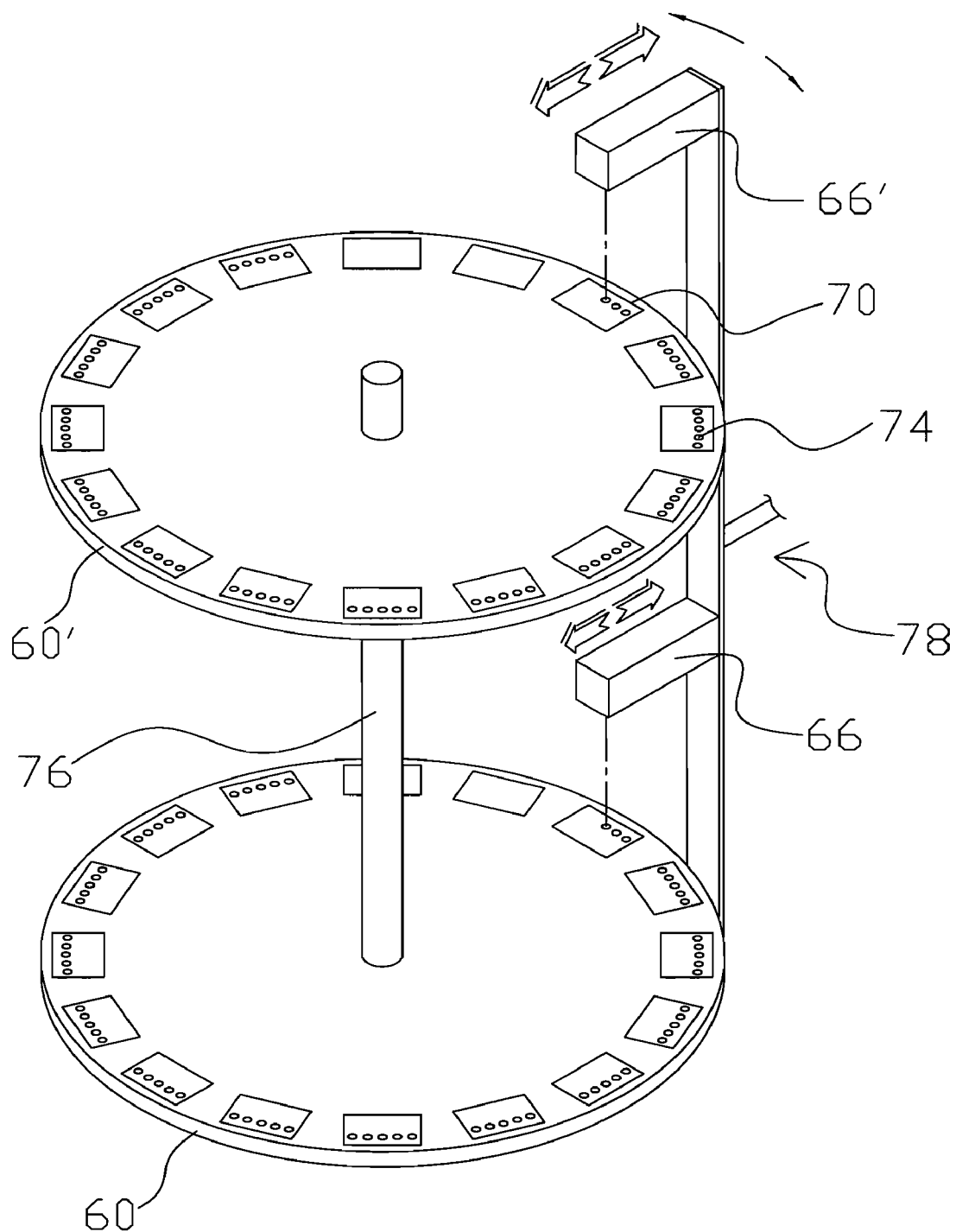
FIG. 13 is a perspective view schematically showing further another embodiment of the present invention, which comprises the structure of the tables and the laser devices stacked one by one.

Refer to FIG. 13 for further another embodiment of the present invention, at least two carry tables and at least two laser devices are stacked one by one to respectively fabricate LGP patterns on different LGP's disposed on different carry tables at the same time. For example, as shown in FIG. 13, two carry tables 60 and 60' are stacked one by one and coupled via a support device 76. A control device controls a second rotation device 64 via a transmission device 78 to drive laser devices 66 and 66' to rotate at the speed corresponding to the emitting frequency of the laser beam. The control device also controls a linear movement device 42 to linearly move the laser device 66 and 66' to the programmed fabrication positions back and forth. Thereby, multiple LGP patterns 74 may be respectively fabricated on multiple LGP's 70 disposed on different carry tables 60 and 60' simultaneously in a single fabrication operation.

According to further another embodiment of the present invention, the laser device may only have rotation movements implemented via a second rotation device, and linear movements are implemented via linearly moving the carry table back and forth. Such a design also has the same effect that multiple LGP patterns are fabricated simultaneously in a single pattern-fabrication operation.

In the conditions of identical laser devices and identical LGP patterns, LGP patterns are respectively fabricated with the conventional technology shown in FIG. 3 and with the system and method of the present invention. The result is that the present invention fabricates the LGP patterns of 32 pieces of LGP's in a single pattern-fabrication operation, and the time interval of one single cycle is only 188.7 seconds, i.e. about 5.9 seconds for one piece of LGP. However, the conventional technology, which fabricates only one LGP pattern in a single operation and needs 345 seconds for a single cycle. In comparison with the conventional technology, the present invention not only overcomes the drawback of the conventional technology that only one LGP pattern is fabricated in a single operation, but also indeed greatly promotes the fabrication speed of LGP patterns. Therefore, the present invention is advantaged in the capability of mass production.

Via integrating rotational movements and linear movements, the present invention not only effectively overcomes the drawback of the conventional technology that only one LGP pattern is fabricated in a single operation, but also fabricates multiple patterns in a single fabrication operation. Thus, the present invention greatly promotes the fabrication speed of patterns and is advantaged in the capability of mass production. Those embodiments described above are to clarify the present invention in order to enable the persons skilled in the art to understand, make and use the present invention. However, it is not intended to limit the scope of the present invention. Any modification and variation according to the spirit of the present invention is to be also included within the scope of the claims of the present invention stated below.

What is claimed is:

1. A spinning-type pattern-fabrication system, comprising:
   at least two rotary tables, used to carry a plurality of objects;
   an object-fixing device, installed to said rotary table and used to fix said objects onto said rotary tables;
   at least two laser devices, respectively emitting a laser beam; and
   a control system, rotating said rotary tables and moving said laser devices linearly back and forth to enable said laser devices to fabricate patterns on said objects with said laser beam emitted via said laser devices,
   wherein at least two of said rotary tables and at least two of said laser devices are stacked one by one to fabricate patterns on said objects disposed on different said rotary tables.

2. The spinning-type pattern-fabrication system according to claim 1,
   wherein said control system further comprises:
   a first rotation device, installed to said rotary tables, and said first rotation device rotates said rotary tables;
   a linear movement device, installed to said laser devices, and said linear movement device moves said laser devices linearly back and forth; and
   a control device, controlling said linear movement device to move said laser devices linearly back and forth according to a plurality of pattern-fabrication positions of said objects, and controlling said first rotation device to drive said rotary tables to rotate at a speed corresponding to a plurality of emitting frequencies of said laser beam, and controlling said laser devices to emit said laser beam according to said emitting frequency of said laser beam.

3. The spinning-type pattern-fabrication system according to claim 2, wherein said control system controls said laser devices to sequentially fabricate patterns on said objects inward from outer sides or outward from the inner sides.

4. The spinning-type pattern-fabrication system according to claim 3, wherein said pattern-fabrication positions of said objects and said emitting frequencies of said laser beam are programmed according to parameters of a pattern design system.

5. The spinning-type pattern-fabrication system according to claim 1, further comprising an air-blowing device, which blows smokes generated via pattern-fabrication process away from said pattern-fabrication positions of said objects via air.

6. The spinning-type pattern-fabrication system according to claim 1, further comprising an angular encoder, which is coupled to said rotary tables and used to detect angular positions of said rotary tables.

7. A spinning-type pattern-fabrication system, comprising:
at least two carry tables, used to carrying a plurality of objects;
an object-fixing device, installed to said carry tables, and used to fix said objects onto said carry tables;
at least two laser devices, respectively emitting a laser beam; and
a control system, rotating said laser devices and moving said laser device linearly back and forth to enable said laser device to fabricate patterns on said objects with said laser beam emitted via said laser device,
wherein at least two of said carry tables and at least two of said laser devices are stacked one by one to fabricate patterns on said objects disposed on different said carry tables.

8. The spinning-type pattern-fabrication system according to claim 7, wherein said control system further comprises:
a second rotation device, installed to said laser devices, and said second rotation device rotates said laser devices;
a linear movement device, installed to said laser devices and used to move said laser devices linearly back and forth; and
a control device, controlling said linear movement device to move said laser devices linearly back and forth according to a plurality of pattern-fabrication positions of said objects, and controlling said second rotation device to drive said laser devices to rotate at a speed corresponding to a plurality of emitting frequencies of said laser beam, and controlling said laser devices to emit said laser beam according to said emitting frequencies of said laser beam.

9. The spinning-type pattern-fabrication system according to claim 8, wherein said control system controls said laser devices to sequentially fabricate patterns on said objects inward from outer sides or outward from inner sides.

10. The spinning-type pattern-fabrication system according to claim 9, wherein said pattern-fabrication positions of said objects and said emitting frequencies of said laser beam are programmed according to a plurality of parameters of a pattern design system.

11. The spinning-type pattern-fabrication system according to claim 7, further comprising an air-blowing device, which blows smokes generated via pattern-fabrication process away from said pattern-fabrication positions of said objects via air.

12. The spinning-type pattern-fabrication system according to claim 7, further comprising an angular encoder, which is coupled to said laser devices and used to detect angular positions of said laser devices.

13. A spinning-type pattern-fabrication method, comprising the following steps:
(a) disposing a plurality of objects uniformly and fixedly along perimeter of at least two carry tables;
(b) utilizing at least two laser devices to fabricate patterns on said objects via one of the following methods:
(b1) controlling said carry tables to rotate and controlling said laser devices to move linearly back and forth to enable said laser devices to fabricate patterns on said objects with a laser beam emitted via said laser devices; and
(b2) controlling said laser devices to rotate and controlling said laser devices to move linearly back and forth to enable said laser devices to fabricate patterns on said objects with said laser beam emitted via said laser devices, wherein at least two of said carry tables and at least two of said laser devices are stacked one by one to fabricate patterns on said objects disposed on different said carry tables.

14. The method according to claim 13, wherein said objects are light guide plates.

15. The method according to claim 13, wherein in Step (a), a vacuum device suck said objects onto said carry table.

16. The method according to claim 13, further comprising a step of programming parameters before Step (a), including: programming pattern-fabrication positions and programming emitting frequencies of said laser beam.

17. The method according to claim 13, wherein in Step (b), said laser devices sequentially fabricate patterns on said objects inward from outer sides or outward from inner sides.

* * * * *